US011812028B2

(12) United States Patent
Deng et al.

(10) Patent No.: US 11,812,028 B2
(45) Date of Patent: Nov. 7, 2023

(54) RESTRICTIONS ON MOTION VECTOR DIFFERENCE

(71) Applicants: Beijing Bytedance Network Technology Co., Ltd., Beijing (CN); Bytedance Inc., Los Angeles, CA (US)

(72) Inventors: Zhipin Deng, Beijing (CN); Li Zhang, San Diego, CA (US); Hongbin Liu, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/546,665

(22) Filed: Dec. 9, 2021

(65) Prior Publication Data

US 2022/0103829 A1      Mar. 31, 2022

Related U.S. Application Data

(63) Continuation of application No. PCT/CN2020/098514, filed on Jun. 28, 2020.

(51) Int. Cl.
*H04N 19/137* (2014.01)
*H04N 19/105* (2014.01)
*H04N 19/132* (2014.01)
*H04N 19/176* (2014.01)

(52) U.S. Cl.
CPC ......... *H04N 19/137* (2014.11); *H04N 19/105* (2014.11); *H04N 19/132* (2014.11); *H04N 19/176* (2014.11)

(58) Field of Classification Search
CPC .. H04N 19/137; H04N 19/105; H04N 19/132; H04N 19/176
See application file for complete search history.

(56) References Cited

U.S. PATENT DOCUMENTS

| 10,448,010 | B2 | 10/2019 | Chen et al. |
| 10,462,462 | B2 | 10/2019 | Chien et al. |
| 10,856,003 | B2 * | 12/2020 | Zhang .................. H04N 19/105 |
| 2007/0019731 | A1 | 1/2007 | Huang |

(Continued)

FOREIGN PATENT DOCUMENTS

| CN | 103561263 A | 2/2014 |
| CN | 108353176 A | 7/2018 |

(Continued)

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019. (Year: 2019).*

(Continued)

*Primary Examiner* — Hesham K Abouzahra
(74) *Attorney, Agent, or Firm* — Perkins Coie LLP

(57) ABSTRACT

Restrictions on motion vector difference are disclosed. In one example method of video processing, performing a conversion between a first block of video and a bitstream representation of the first block based on a constrained signaled MVD component associated with the first block, wherein value of the signaled motion vector difference (MVD) component is constrained in a predetermined range.

20 Claims, 8 Drawing Sheets

(56) References Cited

U.S. PATENT DOCUMENTS

| | | |
|---|---|---|
| 2011/0080954 A1 | 4/2011 | Bossen et al. |
| 2013/0170553 A1 | 7/2013 | Chen et al. |
| 2014/0192885 A1 | 7/2014 | Seregin et al. |
| 2015/0201215 A1 | 7/2015 | Chen et al. |
| 2015/0229945 A1 | 8/2015 | Nakagami et al. |
| 2015/0281708 A1 | 10/2015 | Chuang et al. |
| 2015/0382010 A1 | 12/2015 | Rapaka et al. |
| 2018/0091816 A1 | 3/2018 | Chien et al. |
| 2018/0098089 A1 | 4/2018 | Chen et al. |
| 2018/0249171 A1 | 8/2018 | Lim et al. |
| 2018/0270485 A1 | 9/2018 | Jang et al. |
| 2019/0104319 A1 | 4/2019 | Zhang et al. |
| 2020/0029091 A1 | 1/2020 | Chien et al. |
| 2020/0045310 A1 | 2/2020 | Chen et al. |
| 2020/0213594 A1 | 7/2020 | Liu et al. |
| 2020/0213612 A1 | 7/2020 | Liu et al. |
| 2020/0221117 A1 | 7/2020 | Liu et al. |
| 2020/0236395 A1* | 7/2020 | Lee ..................... H04N 19/184 |
| 2020/0359029 A1 | 11/2020 | Liu et al. |
| 2020/0413040 A1 | 12/2020 | Lim et al. |
| 2021/0029362 A1 | 1/2021 | Liu et al. |
| 2021/0385462 A1 | 12/2021 | Deng et al. |

FOREIGN PATENT DOCUMENTS

| | | |
|---|---|---|
| CN | 109417630 A | 3/2019 |
| CN | 109417631 A | 3/2019 |
| CN | 109792532 A | 5/2019 |
| JP | 2020017970 A | 1/2020 |
| JP | 2022529357 A | 6/2022 |
| JP | 7129958 B2 | 9/2022 |
| WO | 2014015807 A1 | 1/2014 |
| WO | 2014107565 A1 | 7/2014 |
| WO | 2016078599 A | 5/2016 |
| WO | 2017052000 A1 | 3/2017 |
| WO | 2017052009 A1 | 3/2017 |
| WO | 2018002024 A1 | 1/2018 |
| WO | 2018065296 A1 | 4/2018 |
| WO | 2018067672 A1 | 4/2018 |
| WO | 2018095313 A1 | 5/2018 |
| WO | 2018117546 A1 | 6/2018 |
| WO | 2019066514 A1 | 4/2019 |
| WO | 2020216381 A1 | 10/2020 |

OTHER PUBLICATIONS

Bross et al. "Versatile Video Coding (Draft 3)," Joint Video Experts Team (JVET) of ITU-T SG 16 WP 3 and ISO/IEC JTC 1/SC 29/WG 11 12th Meeting, Macao, CN, Oct. 3-12, 2018, document JVET-L1001, 2018.

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M1001, 2019.

Chen et al. "Algorithm Description for Versatile Video Coding and Test Model 4 (VTM 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1002, 2019.

Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-31001, 2017.

Deng et al. "Non-CE4: Cleanups on MVD Ranges," Joint Video Experts Team (JVET) of ITU-T SG 16 WP 3 and ISO/IEC JTC 1/SC 29/WG 11, 15th Meeting: Gothenburg, SE Jul. 3-12, 2019, document JVET-O0567, 2019.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Sasaki et al. ""Non-CE4: MMVD Scaling Fix,"" Joint Video Experts Team (JVET)of ITU-T SG 16 WP 3 and ISO/IEC JTC 1/SC 29/WG 1113th Meeting: Marrakech, MA, Jan. 9-18, 2019, document JVET-M0068, 2019.

VTM software: https://vcgit.hhi.fraunhofer.de/jvet/VVCSoftware_VTM.git.

International Search Report and Written Opinion from PCT/CN2020/087068 dated Jul. 16, 2020 (11 pages).

International Search Report and Written Opinion from PCT/CN2020/098514 dated Sep. 22, 2020 (10 pages).

Non-Final Office Action from U.S. Appl. No. 17/406,359 dated Jan. 20, 2022.

Luo et al. "CE2: Adaptive Precision for Affine MVD Coding (Test 2.1.1)," Joint Video Experts Team (JVET) of ITU-T SG WP 3 and ISO/IEC JTC 1/SC29/WG 11 13th Meeting, Marrakech, MA Jan. 9-18, 2019, document JVET-M0420, 2019. (cited in EP20795211.0 EESR dated Apr. 11, 2022).

Zhang et al. "CE4.3.3: Locally Adaptive Motion Vector Resolution and MVD Coding," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K0357, 2018. (cited in EP20795211.0 EESR dated Apr. 11, 2022).

Extended European Search Report from European Patent Application No. 20795211.0 dated Apr. 11, 2022 (9 pages).

Examination Report from Indian Patent Application No. 202127047224 dated Apr. 20, 2022 (6 pages).

Examination Report from Indian Patent Application No. 202127060333 dated Jun. 6, 2022 (7 pages).

Zhang et al. "On Adaptive Motion Vector Resolution," Joint Collaborative Team on Video Codling (JCT-VC) of ITU-T SG 16 WP 3 and ISO/IEC JTC 1/SC 29/WG 11 20th Meeting, Geneva, CH Feb. 10-18, 2015, JCTVC-T0059, 2015.

Extended European Search Report from European Patent Application No. 20831761.0 dated Aug. 24, 2022 (9 pages).

Xiu et al. "CE2/4/9-Related: Overflow Prevention for Motion Field Storage," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0334, 2019.

Chen et al. "Algorithm Description for Versatile Video Coding and Test Model 5 (VTM 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1002, 2019.

Flynn et al. "High Efficiency Video Coding (HEVC) Range Extensions Text Specification: Draft 4," Joint Collaborative Team on Video Coding (JCT-VC) of ITU-T SG 16 WP 3 and ISO/IEC JTC 1/SC 29/WG 11 13th Meeting, Incheon, KR, Apr. 18-26, 2013, document JCTVC-N1005, 2013.

* cited by examiner (1)

RESTRICTIONS ON MOTION VECTOR DIFFERENCE

CROSS-REFERENCE TO RELATED APPLICATION

This application is a continuation of International Application No. PCT/CN2020/098514, filed on Jun. 28, 2020, which claims the priority to and benefits of International Patent Application No. PCT/CN2019/092851, filed on Jun. 25, 2019. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

The present document describes various embodiments and techniques in which video coding or decoding is performed using motion vectors that are represented using a specified number of bits.

In one example aspect, a video processing method is disclosed. The method includes determining, a range of motion vector difference (MVD) values used for a video region of a video during a conversion between the video region and a bitstream representation of the video region, based on a maximum allowed motion vector resolution, a maximum allowed motion vector precision or a property of the video region and performing the conversion by limiting the MVD values to fall within the range.

In one example aspect, a video processing method is disclosed. The method includes determining, for a conversion between a first block of video and a bitstream representation of the first block, a range of motion vector difference (MVD) component associated with the first block, wherein the range of MVD component is $[-2^M, 2^M-1]$, where M=17; constraining value of the MVD component to be in the range of MVD component; and performing the conversion based on the constrained MVD component.

In one example aspect, a video processing method is disclosed. The method includes determining, for a conversion between a first block of video and a bitstream representation of the first block, a range of motion vector difference (MVD) component associated with the first block, wherein the range of MVD component is adapted to an allowable MVD precision and/or allowable motion vector (MV) precision of a codec; constraining value of the MVD component to be in the range of MVD component; and performing the conversion based on the constrained MVD component.

In one example aspect, a video processing method is disclosed. The method includes determining, for a conversion between a first block of video and a bitstream representation of the first block, a range of motion vector difference (MVD) component associated with the first block based on coded information of the first block; constraining value of the MVD component to be in the range of MVD component; and performing the conversion based on constrained range of MVD component.

In one example aspect, a video processing method is disclosed. The method includes performing a conversion between a first block of video and a bitstream representation of the first block based on a constrained signaled MVD component associated with the first block, wherein value of the signaled motion vector difference (MVD) component is constrained in a predetermined range.

In one example aspect, a video processing method is disclosed. The method includes performing a conversion between a first block of video and a bitstream representation of the first block based on a constrained derived MVD component; wherein value of the derived motion vector difference (MVD) component associated with the first block is constrained in a predetermined range.

In yet another example aspect, a video processing apparatus is disclosed. The apparatus includes a processor configured to perform an-above disclosed method.

In yet another example aspect, a computer readable medium is disclosed. The medium has code for processor-implementation of the above-described methods stored on it.

These, and other, aspects are described in the present document.

DETAILED DESCRIPTION

Section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. SUMMARY

This patent document is related to video coding technologies. Specifically, it is related to inter coding process in video coding. It may be applied to the existing video coding standard like HEVC, or the standard (Versatile Video Coding) to be finalized. It may be also applicable to future video coding standards or video codec.

2. INITIAL DISCUSSION

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

2.1 Coding Flow of a Typical Video Codec

Figure 1:
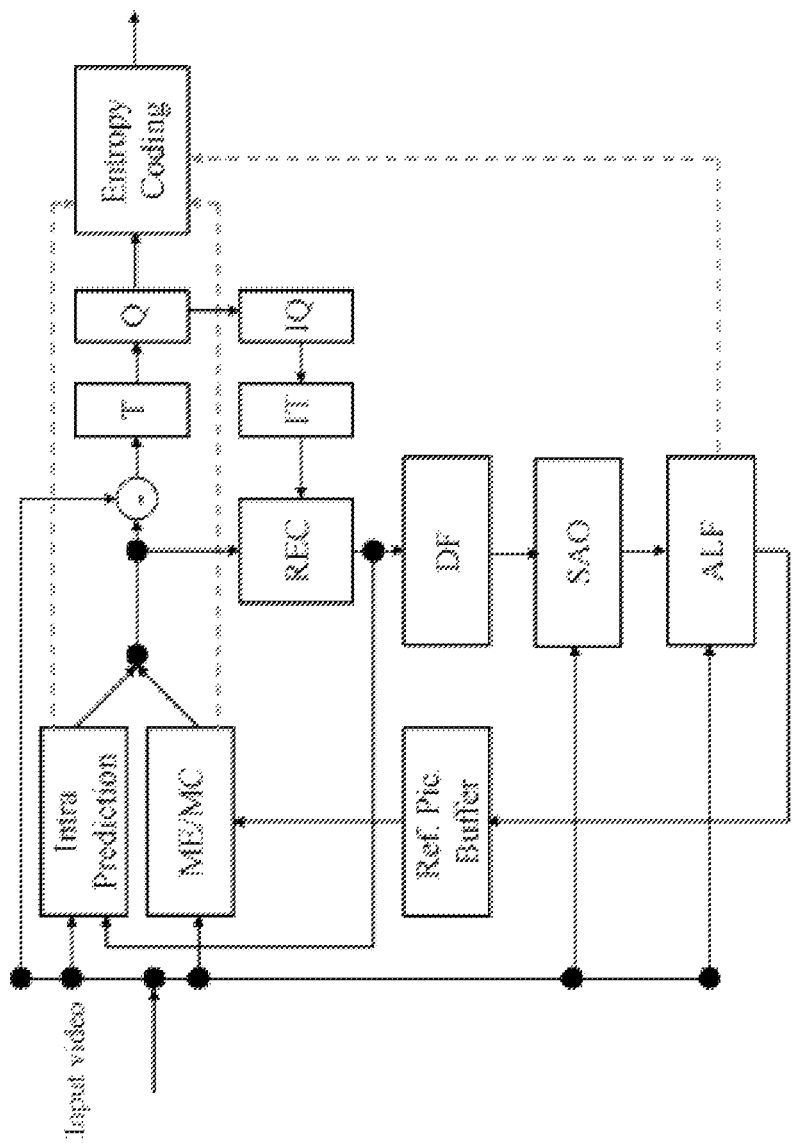
FIG. 1 shows an example encoder block diagram.

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

FIG. 1 shows an example of encoder block diagram.

2.2 Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precision. Dependent on the mode (normal AMVP mode or affine AVMP mode) for the current CU, the MVDs of the current CU can be adaptively selected as follows:

Normal AMVP mode: quarter-luma-sample, integer-luma-sample or four-luma-sample.
Affine AMVP mode: quarter-luma-sample, integer-luma-sample or 1/16 luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signaling is needed and quarter-luma-sample MVD precision is used for the current CU. Otherwise, a second flag is signalled to indicate whether integer-luma-sample or four-luma-sample MVD precision is used for normal AMVP CU. The same second flag is used to indicate whether integer-luma-sample or 1/16 luma-sample MVD precision is used for affine AMVP CU. In order to ensure the reconstructed MV has the intended precision (quarter-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing CU-level RD check three times for each MVD resolution, in VTM4, the RD check of MVD precisions other than quarter-luma-sample is only invoked conditionally. For normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. For affine AMVP mode, if affine inter mode is not selected after checking rate-distortion costs of affine merge/skip mode, merge/skip mode, quarter-luma sample MVD precision normal AMVP mode and quarter-luma sample MVD precision affine AMVP mode, then 1/16 luma-sample MV precision and 1-pel MV precision affine inter modes are not checked. Furthermore, affine parameters obtained in quarter-luma-sample MV precision affine inter mode are used as starting search point in 1/16 luma-sample and quarter-luma-sample MV precision affine inter modes.

2.3 Affine AMVP Prediction in VVC

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:
1) Inherited affine AMVP candidates that extrapolated from the CPMVs of the neighbour CUs
2) Constructed affine AMVP candidates CPMVPs that are derived using the translational MVs of the neighbour CUs
3) Translational MVs from neighboring CUs
4) Zero MVs The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Constructed AMVP candidate is derived from the specified spatial neighbors. In addition, reference picture index of the neighboring block is also checked. The first block in the checking order that is inter coded and has the same reference picture as in current CUs is used. There is only one When the current CU is coded with 4-parameter affine mode, and $mv_o$ and $mv_i$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If affine AMVP list candidates is still less than 2 after inherited affine AMVP candidates and Constructed AMVP candidate are checked, $mv_0$, $mv_1$ and $mv_2$ will be added, in order, as the translational MVs to predict all control point MVs of the current CU, when available. Finally, zero MVs are used to fill the affine AMVP list if it is still not full.

2.4 Merge Mode with MVD (MMVD) in VVC

In addition to merge mode, where the implicitly derived motion information is directly used for prediction samples generation of the current CU, the merge mode with motion vector differences (MMVD) is introduced in VVC. A MMVD flag is singnaled right after sending a skip flag and merge flag to specify whether MMVD mode is used for a CU.

In MMVD, after a merge candidate is selected, it is further refined by the signalled MVDs information. The further information includes a merge candidate flag, an index to specify motion magnitude, and an index for indication of motion direction. In MMVD mode, one for the first two candidates in the merge list is selected to be used as MV basis. The merge candidate flag is signalled to specify which one is used.

Distance index specifies motion magnitude information and indicate the pre-defined offset from the starting point. An offset is added to either horizontal component or vertical component of starting MV. The relation of distance index and pre-defined offset is specified in Table.

In VVC, there is an SPS flag sps_fpel_mmvd_enabled_flag for fractional MMVD offset on/off at spss level. And a tile group flag tile_group_fpel_mmvd_enabled_flag to control the fractional MMVD offset on/off for "SCC/UHD frame" at title group header level. If fractional MVD is enabled, the default distance table in Table 1 is used. otherwise, all offset elements in the default distance in Table 1 are left shift by 2.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table specifies the sign of MV offset added to the list0 MV component of starting MV and the sign for the list1 MV has opposite value.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

2.5 Intra Block Copy (IBC) in VVC

Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture.

IN VVC, the luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

IBC mode is also known as current picture reference (CPR) mode.

2.6 Motion Vector Difference in VVC Specification/Working Draft

The following texts are extracted from VVC working draft.

7.3.6.8 Motion Vector Difference Syntax

| | Descriptor |
|---|---|
| mvd_coding( x0, y0, refList ,cpIdx ) { | |
|     abs_mvd_greater0_flag[ 0 ] | ae(v) |
|     abs_mvd_greater0_flag[ 1 ] | ae(v) |
|     if( abs_mvd_greater0_flag[ 0 ] ) | |
|         abs_mvd_greater1_flag[ 0 ] | ae(v) |
|     if( abs_mvd_greater0_flag[ 1 ] ) | |
|         abs_mvd_greater1_flag[ 1 ] | ae(v) |
|     if( abs_mvd_greater0_flag[ 0 ] ) { | |
|         if( abs_mvd_greater1_flag[ 0 ] ) | |
|             abs_mvd_minus2[ 0 ] | ae(v) |
|         mvd_sign_flag[ 0 ] | ae(v) |
|     } | |
|     if( abs_mvd_greater0_flag[ 1 ] ) { | |
|         if( abs_mvd_greater1_flag[ 1 ] ) | |
|             abs_mvd_minus2[ 1 ] | ae(v) |
|         mvd_sign_flag[ 1 ] | ae(v) |
|     } | |
| } | |
| merge_data( x0, y0, cbWidth, cbHeight ) { | |
|     if ( CuPredMode[ x0 ][ y0 ] = = MODE_IBC ) { | |
|         if( MaxNumMergeCand > 1 ) | |
|             merge_idx[ x0 ][ y0 ] | ae(v) |
|     } else { | |
|         mmvd_flag[ x0 ][ y0 ] | ae(v) |
|         if( mmvd_flag[ x0 ][ y0 ] = = 1 ) { | |
|             mmvd_merge_flag[ x0 ][ y0 ] | ae(v) |
|             mmvd_distance_idx[ x0 ][ y0 ] | ae(v) |
|             mmv_direction_idx[ x0 ][ y0 ] | ae(v) |
|         } else { | |
|             if( MaxNumSubblockMergeCand > 0 && cbWidth >= 8 && cbHeight >= 8 ) | |
|                 merge_subblock_flag[ x0 ][ y0 ] | ae(v) |
|             if( merge_subblock_flag[ x0 ][ y0 ] = = 1 ) { | |
|                 if( MaxNumSubblockMergeCand > 1 ) | |
|                     merge_subblock_idx[ x0 ][ y0 ] | ae(v) |
|             } else { | |
|                 if( sps_ciip_enabled_flag && cu_skip_flag[ x0 ][ y0 ] = = 0 && | |
|                   ( cbWidth * cbHeight ) >= 64 && cbWidth < 128 && cbHeight < 128 ) { | |
|                   ciip_flag[ x0 ][ y0 ] | ae(v) |
|                 if( ciip_flag[ x0 ][ y0 ] ) { | |
|                   if ( cbWidth <= 2 * cbHeight \| \| cbHeight <= 2 * cbWidth ) | |
|                       ciip_luma_mpm_flag[ x0 ][ y0 ] | ae(v) |
|                   if( ciip_luma_mpm_flag[ x0 ][ y0 ] ) | |
|                       ciip_luma_mpm_idx[ x0 ][ y0 ] | ae(v) |
|                 } | |
|                 } | |
|                 if( sps_triangle_enabled_flag && tile_group_type = = B && | |
|                   ciip_flag[ x0 ][ y0 ] = = 0 && cbWidth * cbHeight >= 64 ) | |
|                     merge_triangle_flag[ x0 ][ y0 ] | ae(v) |
|                 if( merge_triangle_flag[ x0 ][ y0 ] ) { | |
|                   merge_triangle_split_dir[ x0 ][ y0 ] | ae(v) |
|                   merge_triangle_idx0[ x0 ][ y0 ] | ae(v) |
|                   merge_triangle_idx1[ x0 ][ y0 ] | ae(v) |
|                 } else if( MaxNumMergeCand > 1 ) | |
|                   merge_idx[ x0 ][ y0 ] | ae(v) |
|             } | |
|         } | |
|     } | |
| } | |

7.3.6.7 Merge Data Syntax
7.4.3.1 Sequence Parameter Set RBSP Semantics sps_amvr_enabled_flag equal to 1 specifies that adaptive motion vector difference resolution is used in motion vector coding. amvr_enabled_flag equal to 0 specifies that adaptive motion vector difference resolution is not used in motion vector coding.

sps_affine_amvr_enabled_flag equal to 1 specifies that adaptive motion vector difference resolution is used in motion vector coding of affine inter mode. sps_affine_amvr_enabled_flag equal to 0 specifies that adaptive motion vector difference resolution is not used in motion vector coding of affine inter mode.

sps_fpel_mmvd_enabled_flag equal to 1 specifies that merge mode with motion vector difference is using integer sample precision. sps_fpel_mmvd_enabled_flag equal to 0 specifies that merge mode with motion vector difference can use fractional sample precision.

7.4.5.1 General Tile Group Header Semantics tile_group_fpel_mmvd_enabled_flag equal to 1 specifies that merge mode with motion vector difference uses integer sample precision in the current tile group.

tile_group_fpel_mmvd_enabled_flag equal to 0 specifies that merge mode with motion vector difference can use fractional sample precision in the current tile group. When not present, the value of tile_group_fpel_mmvd_enabled_flag is inferred to be 0.

7.4.7.5 Coding Unit Semantics amvr_flag[x0][y0] specifies the resolution of motion vector difference. The array indices x0, y0 specify the location (x0, y0) of the top-left luma sample of the considered coding block relative to the top-left luma sample of the picture. amvr_flag[x0][y0] equal to 0 specifies that the resolution of the motion vector difference is ¼ of a luma sample. amvr_flag[x0][y0] equal to 1 specifies that the resolution of the motion vector difference is further specified by amvr_precision_flag[x0][y0].

When amvr_flag[x0][y0] is not present, it is inferred as follows:

If CuPredMode[x0][y0] is equal to MODE_IBC, amvr_flag[x0][y0] is inferred to be equal to 1.

Otherwise (CuPredMode[x0][y0] is not equal to MODE_IBC), amvr_flag[x0][y0] is inferred to be equal to 0.

amvr_precision_flag[x0][y0] equal to 0 specifies that the resolution of the motion vector difference is one integer luma sample if inter_affine_flag[x0][y0] is equal to 0, and 1/16 of a luma sample otherwise. amvr_precision_flag[x0][y0] equal to 1 specifies that the resolution of the motion vector difference is four luma samples if inter_affine_flag[x0][y0] is equal to 0, and one integer luma sample otherwise. The array indices x0, y0 specify the location (x0, y0) of the top-left luma sample of the considered coding block relative to the top-left luma sample of the picture.

When amvr_precision_flag[x0][y0] is not present, it is inferred to be equal to 0. The motion vector differences are modified as follows:

If inter_affine_flag[x0][y0] is equal to 0, the variable MvShift is derived and the variables MvdL0[x0][y0][0], MvdL0[x0][y0][1], MvdL1[x0][y0][0], MvdL1[x0][y0][1] are modified as follows:

MvShift=(amvr_flag[x0][y0]+amvr_precision_flag[x0][y0])<<1  (7-98)

MvdL0[x0][y0][0]=MvdL0[x0][y0][0]<<(MvShift+2)  (7-99)

MvdL0[x0][y0][1]=MvdL0[x0][y0][1]<<(MvShift+2)  (7-100)

MvdL1[x0][y0][0]=MvdL1[x0][y0][0]<<(MvShift+2)  (7-101)

MvdL1[x0][y0][1]=MvdL1[x0][y0][1]<<(MvShift+2)  (7-102)

Otherwise (inter_affine_flag[x0][y0] is equal to 1), the variable MvShift is derived and the variables MvdCpL0[x0][y0][0][0], MvdCpL0[x0][y0][0][1], MvdCpL0[x0][y0][1][0], MvdCpL0[x0][y0][1][1], MvdCpL0[x0][y0][2][0] and MvdCpL0[x0][y0][2][1] are modified as follows:

MvShift=amvr_precision_flag[x0][y0]?
(amvr_precision_flag[x0][y0]<<1):(-(amvr_flag[x0][y0]<<1)))  (7-103)

MvdCpL0[x0][y0][0][0]=MvdCpL0[x0][y0][0][0]<<(MvShift+2)  (7-104)

MvdCpL1[x0][y0][0][1]=MvdCpL1[x0][y0][0][1]<<(MvShift+2)  (7-105)

MvdCpL0[x0][y0][1][0]=MvdCpL0[x0][y0][1][0]<<(MvShift+2)  (7-106)

MvdCpL1[x0][y0][1][1]=MvdCpL1[x0][y0][1][1]<<(MvShift+2)  (7-107)

MvdCpL0[x0][y0][2][0]=MvdCpL0[x0][y0][2][0]<<(MvShift+2)  (7-108)

MvdCpL1[x0][y0][2][1]=MvdCpL1[x0][y0][2][1]<<(MvShift+2)  (7-109)

7.4.7.7 Merge Data Semantics merge_flag[x0][y0] specifies whether the inter prediction parameters for the current coding unit are inferred from a neighbouring inter-predicted partition. The array indices x0, y0 specify the location (x0, y0) of the top-left luma sample of the considered coding block relative to the top-left luma sample of the picture.

When merge_flag[x0][y0] is not present, it is inferred as follows:

If cu_skip_flag[x0][y0] is equal to 1, merge_flag[x0][y0] is inferred to be equal to 1.

Otherwise, merge_flag[x0][y0] is inferred to be equal to 0.

mmvd_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

When mmvd_flag[x0][y0] is not present, it is inferred to be equal to 0.

mmvd_merge_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the top-left luma sample of the considered coding block relative to the top-left luma sample of the picture.

mmvd_distance_idx[x0][y0] specifies the index used to derive MmvdDistance[x0][y0] as specified in Table 7-11. The array indices x0, y0 specify the location (x0, y0) of the top-left luma sample of the considered coding block relative to the top-left luma sample of the picture.

TABLE 7-11

Specification of MmvdDistance[ x0 ][ y0 ] based on mmvd_distance_idx[x0][ y0 ].

| mmvd_distance_idx[ x0 ][ y0 ] | MmvdDistance[ x0 ][ y0 ] | |
|---|---|---|
| | tile_group_fpel_mmvd_enabled_flag == 0 | tile_group_fpel_mmvd_enabled_flag == 1 |
| 0 | 1 | 4 |
| 1 | 2 | 8 |
| 2 | 4 | 16 |

TABLE 7-11-continued

Specification of MmvdDistance[ x0 ][ y0 ] based on mmvd_distance_idx[x0][ y0 ].

| mmvd_distance_idx[ x0 ][ y0 ] | MmvdDistance[ x0 ][ y0 ] | |
| --- | --- | --- |
| | tile_group_fpel_mmvd_enabled_flag == 0 | tile_group_fpel_mmvd_enabled_flag == 1 |
| 3 | 8 | 32 |
| 4 | 16 | 64 |
| 5 | 32 | 128 |
| 6 | 64 | 256 |
| 7 | 128 | 512 | mmvd_direction_idx[x0][y0] specifies index used to derive MmvdSign[x0][y0] as specified in Table 7-12. The array indices x0, y0 specify the location (x0, y0) of the top-left luma sample of the considered coding block relative to the top-left luma sample of the picture.

TABLE 7-12

Specification of MmvdSign[ x0 ][ y0 ] based on mmvd_direction_idx[ x0 ][ y0 ]

| mmvd_direction_idx[ x0 ][ y0 ] | MmvdSign[ x0 ][ y0 ][0] | MmvdSign[ x0 ][ y0 ][1] |
| --- | --- | --- |
| 0 | +1 | 0 |
| 1 | −1 | 0 |
| 2 | 0 | +1 |
| 3 | 0 | −1 |

Both components of of the merge plus MVD offset MmvdOffset[x0][y0] are derived as follows:

MmvdOffset[x0][y0][0]=(MmvdDistance[x0][y0]<<2)
*MmvdSign[x0][y0][0]     (7-112)

MmvdOffset[x0][y0][1]=(MmvdDistance[x0][y0]<<2)
*MmvdSign[x0][y0][1]     (7-113)

merge_subblock_flag[x0][y0] specifies whether the sub-block-based inter prediction parameters for the current coding unit are inferred from neighbouring blocks. The array indices x0, y0 specify the location (x0, y0) of the top-left luma sample of the considered coding block relative to the top-left luma sample of the picture. When merge_subblock_flag[x0][y0] is not present, it is inferred to be equal to 0.

merge_subblock_idx[x0][y0] specifies the merging candidate index of the subblock-based merging candidate list where x0, y0 specify the location (x0, y0) of the top-left luma sample of the considered coding block relative to the top-left luma sample of the picture.

When merge_subblock_idx[x0][y0] is not present, it is inferred to be equal to 0.

ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred to be equal to 0.

The syntax elements ciip_luma_mpm_flag[x0][y0], and ciip_luma_mpm_idx[x0][y0]specify the intra prediction mode for luma samples used in combined inter-picture merge and intra-picture prediction. The array indices x0, y0 specify the location (x0, y0) of the top-left luma sample of the considered coding block relative to the top-left luma sample of the picture. The intra prediction mode is derived according to clause 8.5.6.

When ciip_luma_mpm_flag[x0][y0] is not present, it is inferred as follows:
  If cbWidth is greater than 2*cbHeight or cbHeight is greater than 2*cbWidth, ciip_luma_mpm_flag[x0][y0] is inferred to be equal to 1.
  Otherwise, ciip_luma_mpm_flag[x0][y0] is inferred to be equal to 0.

merge_triangle_flag[x0][y0] equal to 1 specifies that for the current coding unit, when decoding a B tile group, triangular shape based motion compensation is used to generate the prediction samples of the current coding unit. merge_triangle_flag[x0][y0] equal to 0 specifies that the coding unit is not predicted by triangular shape based motion compensation. When merge_triangle_flag[x0][y0] is not present, it is inferred to be equal to 0.

merge_triangle_split_dir[x0][y0] specifies the splitting direction of merge triangle mode. The array indices x0, y0 specify the location (x0, y0) of the top-left luma sample of the considered coding block relative to the top-left luma sample of the picture.

When merge_triangle_split_dir[x0][y0] is not present, it is inferred to be equal to 0.

merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture.

When merge_triangle_idx0[x0][y0] is not present, it is inferred to be equal to 0.

merge_triangle_idx1[x0][y0] specifies the second merging candidate index of the triangular shape based motion compensation candidate list where x0, y0 specify the location (x0, y0) of the top-left luma sample of the considered coding block relative to the top-left luma sample of the picture.

When merge_triangle_idx1[x0][y0] is not present, it is inferred to be equal to 0.

merge_idx[x0][y0] specifies the merging candidate index of the merging candidate list where x0, y0 specify the location (x0, y0) of the top-left luma sample of the considered coding block relative to the top-left luma sample of the picture.

When merge_idx[x0][y0] is not present, it is inferred as follows:
If mmvd_flag[x0][y0] is equal to 1, merge_idx[x0][y0] is inferred to be equal to mmvd_merge_flag[x0][y0].
Otherwise (mmvd_flag[x0][y0] is equal to 0), merge_idx[x0][y0] is inferred to be equal to 0.

7.4.7.8 Motion Vector Difference Semantics abs_mvd_greater0_flag[compIdx] specifies whether the absolute value of a motion vector component difference is greater than 0.

abs_mvd_greater1_flag[compIdx] specifies whether the absolute value of a motion vector component difference is greater than 1.

When abs_mvd_greater1_flag[compIdx] is not present, it is inferred to be equal to 0.

abs_mvd_minus2[compIdx] plus 2 specifies the absolute value of a motion vector component difference.

When abs_mvd_minus2[compIdx] is not present, it is inferred to be equal to −1.

mvd_sign_flag[compIdx] specifies the sign of a motion vector component difference as follows:
If mvd_sign_flag[compIdx] is equal to 0, the corresponding motion vector component difference has a positive value.
Otherwise (mvd_sign_flag[compIdx] is equal to 1), the corresponding motion vector component difference has a negative value.

When mvd_sign_flag[compIdx] is not present, it is inferred to be equal to 0.

The motion vector difference 1Mvd[compIdx] for compIdx=0 . . . 1 is derived as follows:

$$1Mvd[compIdx]=abs\_mvd\_greater0\_flag[compIdx]*(abs\_mvd\_minus2[compIdx]+2)*(1-2*mvd\_sign\_flag[compIdx]) \quad (7\text{-}114)$$

The Value of 1Mvd[compIdx] Shall be in the Range of $-2^{15}$ to $2^{15}-1$, Inclusive.

Depending in the value of MotionModelIdc[x][y], motion vector differences are derived as follows:
If MotionModelIdc[x][y] is equal to 0, the variable MvdLX[x0][y0][compIdx], with X being 0 or 1, specifies the difference between a list X vector component to be used and its prediction. The array indices x0, y0 specify the location (x0, y0) of the top-left luma sample of the considered coding block relative to the top-left luma sample of the picture. The horizontal motion vector component difference is assigned compIdx=0 and the vertical motion vector component is assigned compIdx=1.
If refList is equal to 0, MvdL0[x0][y0][compIdx] is set equal to 1Mvd[compIdx] for compIdx=0 . . . 1.
Otherwise (refList is equal to 1), MvdL1[x0][y0][compIdx] is set equal to 1Mvd[compIdx] for compIdx=0 . . . 1.
Otherwise (MotionModelIdc[x][y] is not equal to 0), the variable MvdCpLX[x0][y0][cpIdx][compIdx], with X being 0 or 1, specifies the difference between a list X vector component to be used and its prediction. The array indices x0, y0 specify the location (x0, y0) of the top-left luma sample of the considered coding block relative to the top-left luma sample of the picture, the array index cpIdx specifies the control point index. The horizontal motion vector component difference is assigned compIdx=0 and the vertical motion vector component is assigned compIdx=1.
If refList is equal to 0, MvdCpL0[x0][y0][cpIdx][compIdx] is set equal to 1Mvd[compIdx] for compIdx=0 . . . 1.
Otherwise (refList is equal to 1), MvdCpL1[x0][y0][cpIdx][compIdx] is set equal to 1Mvd[compIdx] for compIdx=0 . . . 1.

3. EXAMPLES OF PROBLEMS SOLVED BY EMBODIMENTS DESCRIBED IN THE PRESENT DOCUMENT

The motion vector difference (MVD) is not always quarter-pel (e.g., ¼-luma-sample) resolution in some coding standards like VVC. However, in the existing VVC working draft, there is a bitstream constraint that always clip the MVD component to a range of $-2^{15}$ to $2^{15}-1$. This may result in inaccurate MVD value, especially while non-quarter-pel MVD resolution is used (e.g., ¹⁄₁₆-luma-sample MVD resolution while affine AMVP is used).

4. EXAMPLE EMBODIMENTS AND TECHNIQUES

The embodiments listed below should be considered as examples to explain general concepts. These examples should not be interpreted in a narrow way. Furthermore, these examples can be combined in any suitable manner.

In the following description, a "motion vector difference (MVD) component" denotes either a motion vector difference in horizontal direction (e.g., along x-axis), or a motion vector difference in vertical direction (e.g., along y-axis).

For sub-pixel motion vector (MV) representation, a motion vector usually consist of a fractional part and an integer part. Suppose the range of a MV is $[-2^M, 2^M-1]$ wherein M is a positive integer value, M=K+L, in which K denotes the range of the integer part of a MV, and L denotes the range of the fractional part of a MV, wherein the MV is represented in the $(½^L)$-luma-sample precision. For example, in HEVC, K=13, L=2, thus M=K+L=15. Whereas in VVC, K=13, L=4, and M=K+L=17.

1. It is proposed that the range of MVD component may depend on the allowable MVD resolution/precision of a codec.
   a) In one example, same range may be applied to all MVD components.
      i. In one example, the range of MVD component is the same as that of MV range, such as $[-2^M, 2^M-1]$, such as M=17.
   b) In one example, all decoded MVD components may be first scaled to a predefined precision $(½^L)$-luma-sample (e.g., L=4), and then clipped to a predefined range $[-2^M, 2^M-1]$ (e.g., M=17).
   c) In one example, the range of MVD component may depend on the allowable MVD/MV resolutions in a codec.
      i. In one example, suppose the allowable resolutions of MVDs are ¹⁄₁₆-luma-sample, ¼-luma-sample, 1-luma-sample, or 4-luma-sample, then the value of MVD component may be clipped/constraint according to the finest resolution (e.g., ¹⁄₁₆-luma-sample among all these possible resolutions), that is, the value of MVD may be in the range of $[-2^{K+L}, 2^{K+L}-1]$, such as K=13, L=4.

2. It is proposed that the range of the MVD component may depend on the coded information of a block.
   a) In one example, multiple sets of ranges of MVD components may be defined.
   b) In one example, the range may be dependent on the MV predictor/MVD/MV precision.
      i. In one example, suppose MVD precision of an MVD component is ($\frac{1}{2}^L$)-luma-sample (e.g., L=4, 3, 2, 1, 0, −1, −2, −3, −4, and etc.), then the value of MVD may be constrained or/and clipped to the range of [$-2^{K+L}$, $2^{K+L}-1$], such as K=13, L=4, 3, 2, 1, 0, −1, −2, −3, −4.
      ii. In one example, the range of the MVD component may depend on the variable MvShift, where the MvShift may be derived from affine_inter_flag, amvr_flag, and amvr_precision_flag in VVC.
         1. In one example, the MvShift may be derived by the coded information such as affine_inter_flag, amvr_flag, and/or amvr_precision_flag, and/or sps_fpel_mmvd_enabled_flag, and/or tile_group_fpel_mmvd_enabled_flag, and/or mmvd_distance_idx, and/or CuPredMode, and etc.
   c) In one example, the MVD range may be dependent on the coding mode, motion model etc. of the block.
      i. In one example, the range of the MVD component may depend on the motion model (e.g., MotionModelIdc in the specification), and/or the prediction mode, and/or the affine_inter_flag, of the current block.
      ii. In one example, if the prediction mode of the current block is MODE_IBC (e.g., current block is coded in IBC mode), the the value of MVD may be in the range of [$-2^{K+L}$, $2^{K+L}-1$], such as K=13, L=0.
      iii. In one example, if the motion model index (e.g., MotionModelIdc in the specification) of current block is equal to 0 (e.g., current block is predicted using translational motion model), then the value of MVD may be in the range of [$-2^{K+L}$, $2^{K+L}-1$], such as K=13, L=2.
         1. Alternatively, if the prediction mode of the current block is MODE_INTER and affine_inter_flag is false (e.g., current block is predicted using translational motion model), the the value of MVD may be in the range of [$-2^{K+L}$, $2^{K+L}-1$], such as K=13, L=2.
      iv. In one example, if the motion model index (e.g., MotionModelIdc in the specification) of current block is NOT equal to 0 (e.g., current block is predicted using affine motion model), the the value of MVD may be in the range of [$-2^{K+L}$, $2^{K+L}-1$], such as K=13, L=4.
         1. Alternatively, if the prediction mode of the current block is MODE_INTER and affine_inter_flag is true (e.g., current block is predicted using affine motion model), the value of MVD may be in the range of [$-2^{K+L}$, $2^{K+L}-1$], such as K=13, L=4.
   d) Instead of adding a constraint on the decoded MVD component, it is proposed to add a constraint on the rounded MVD values.
      i. In one example, a conformance bitstream shall satisfy that the rounded integer MVD value shall be within a given range.
         1. In one example, the integer MVD (if the decoded MVD is in fractional precision, rounding is needed) shall be in the range of [$-2^K$, $2^K-1$], e.g., K=13.

3. It is proposed that the value of the decoded MVD component may be explicitly clipped to a range (e.g., MVD range described above) during the semantic interpretation, other than using a bitstream constraint.

5. EMBODIMENTS

5.1 Embodiment #1

The embodiment below is for the method in item 1 of Section 4.

Newly added parts are highlighted in *italicized bold*, , and the deleted parts from VVC working draft are highlighted in double square brackets [[ ]].

7.4.7.8 Motion Vector Difference Semantics

The motion vector difference lMvd[compIdx] for compIdx=0 . . . 1 is derived as follows:

$$lMvd[compIdx]=abs\_mvd\_greater0\_flag[compIdx]*(abs\_mvd\_minus2[compIdx]+2)*(1-2*mvd\_sign\_flag[compIdx]) \quad (7\text{-}114)$$

[[The value of lMvd[compIdx] shall be in the range of $-2^{15}$ to $2^{15}-1$, inclusive.]]

*The value of lMvd[ compIdx ] shall be in the range of $-2^{17}$ to $2^{17}-1$, inclusive.*

5.2 Embodiment #2

The embodiment below is for the method in item 2 of Section 4.

Newly added parts are highlighted in italicized bold, and the deleted parts from VVC working draft are highlighted in double square brackets [[ ]].

7.4.7.9 Motion Vector Difference Semantics

The motion vector difference lMvd[compIdx] for compIdx=0 . . . 1 is derived as follows:

$$lMvd[compIdx]=abs\_mvd\_greater0\_flag[compIdx]*(abs\_mvd\_minus2[compIdx]+2)*(1-2*mvd\_sign\_flag[compIdx]) \quad (7\text{-}114)$$

[[The value of lMvd[compIdx] shall be in the range of $-2^{15}$ to $2^{15}-1$, inclusive.]]

*The value of lMvd[ compIdx ] shall be in the range of −(1<<log2MvdRange) to (1<<log2MvdRange) −1, inclusive, where log2MvdRange is derived as follows:*

$$log2MvdRange = 15 - MvShift \quad (7\text{-}115)$$

5.3 Embodiment #3

The embodiment below is for the method in item 2 of Section 4.

Newly added parts are highlighted in *italicized bold*, , and the deleted parts from VVC working draft are highlighted in double square brackets [[ ]].

7.4.7.10 Motion Vector Difference Semantics

The motion vector difference lMvd[compIdx] for compIdx=0 . . . 1 is derived as follows:

$$lMvd[compIdx]=abs\_mvd\_greater0\_flag[compIdx]*(abs\_mvd\_minus2[compIdx]+2)*(1-2*mvd\_sign\_flag[compIdx]) \quad (7\text{-}114)$$

[[The value of lMvd[compIdx] shall be in the range of $-2^{15}$ to $2^{15}-1$, inclusive.]]

*If MotionModelIdc[ x ][ y ] is not equal to 0, the value of lMvd[ compIdx ] shall be in the range of $-2^{17}$ to $2^{17}-1$, inclusive.*

*Else, the value of lMvd[ compIdx ]*
*shall be in the range of $-2^{15}$ to $2^{15}-1$, inclusive.*

5.4 Embodiment #4

The embodiment below is also for the method in item 2 of Section 4.

Newly added parts are highlighted in *italicized bold,*, and the deleted parts from VVC working draft are highlighted in double square brackets [[ ]].

7.4.7.11 Motion Vector Difference Semantics

The motion vector difference lMvd[compIdx] for compIdx=0 . . . 1 is derived as follows:

lMvd[compIdx]=abs_*mvd*_greater0_flag[compIdx]*
(abs_*mvd*_minus2[compIdx]+2)*(1−
2**mvd*_sign_flag[compIdx])  (7-114)

[[The value of lMvd[compIdx] shall be in the range of $-2^{15}$ to $2^{15}-1$, inclusive.]]

*If MotionModelIdc[ x ][ y ] is not equal to 0, the value of lMvd[ compIdx ] shall be in the*
*range of $-2^{17}$ to $2^{17}-1$, inclusive.*

*Else if CuPredMode[ x0 ][ y0 ]*
*= = MODE_IBC, the value of lMvd[ compIdx ]*
*shall be in the range of $-2^{13}$ to $2^{13}-1$, inclusive.*

*Else, the value of lMvd[ compIdx ] shall be*
*in the range of $-2^{15}$ to $2^{15}-1$, inclusive.*

5.5 Embodiment #5

The embodiment below is for the method in item 3 and item 1 of Section 4.

Newly added parts are highlighted in *italicized bold,*, and the deleted parts from VVC working draft are highlighted in double square brackets [[ ]].

7.4.7.12 Motion Vector Difference Semantics

The motion vector difference lMvd[compIdx] for compIdx=0 . . . 1 is derived as follows:

lMvd[compIdx]=abs_*mvd*_greater0_flag[compIdx]*
(abs_*mvd*_minus2[compIdx]+2)*(1−
2**mvd*_sign_flag[compIdx])  (7-114)

*lMvd[ compIdx ] = Clip3($-2^{17}$, $2^{17}-1$,*
*lMvd[ compIdx ])*  (7-115)

[[The value of lMvd[compIdx] shall be in the range of $-2^{15}$ to $2^{15}-1$, inclusive.]]

5.6 Embodiment #6

The embodiment below is for the method in item 3 and item 2 of Section 4.

Newly added parts are highlighted in *italicized bold,*, and the deleted parts from VVC working draft are highlighted in double square brackets [[ ]].

7.4.7.13 Motion Vector Difference Semantics

The motion vector difference lMvd[compIdx] for compIdx=0 . . . 1 is derived as follows:

lMvd[compIdx]=abs_*mvd*_greater0_flag[compIdx]*
(abs_*mvd*_minus2[compIdx]+2)*(1−
2**mvd*_sign_flag[compIdx])  (7-114)

[[The value of lMvd[compIdx] shall be in the range of $-2^{15}$ to $2^{15}-1$, inclusive.]]

Depending in the value of MotionModelIdc[x][y], motion vector differences are derived as follows:

If MotionModelIdc[x][y] is equal to 0, the variable MvdLX[x0][y0][compIdx], with X being 0 or 1, specifies the difference between a list X vector component to be used and its prediction. The array indices x0, y0 specify the location (x0, y0) of the top-left luma sample of the considered coding block relative to the top-left luma sample of the picture. The horizontal motion vector component difference is assigned compIdx=0 and the vertical motion vector component is assigned compIdx=1.

*lMvd[ compIdx ] = Clip3($-2^{15}$, $2^{15}-1$, lMvd[ compIdx ])*

If refList is equal to 0, MvdL0[x0][y0][compIdx] is set equal to lMvd[compIdx] for compIdx=0 . . . 1.

Otherwise (refList is equal to 1), MvdL1[x0][y0][compIdx] is set equal to lMvd[compIdx] for compIdx=0 . . . 1.

Otherwise (MotionModelIdc[x][y] is not equal to 0), the variable MvdCpLX[x0][y0][cpIdx][compIdx], with X being 0 or 1, specifies the difference between a list X vector component to be used and its prediction. The array indices x0, y0 specify the location (x0, y0) of the top-left luma sample of the considered coding block relative to the top-left luma sample of the picture, the array index cpIdx specifies the control point index. The horizontal motion vector component difference is assigned compIdx=0 and the vertical motion vector component is assigned compIdx=1.

*lMvd[ compIdx ] = Clip3($-2^{17}$, $2^{17}-1$, lMvd[ compIdx ])*

If refList is equal to 0, MvdCpL0[x0][y0][cpIdx][compIdx] is set equal to lMvd[compIdx] for compIdx=0 . . . 1.

Otherwise (refList is equal to 1), MvdCpL1[x0][y0][cpIdx][compIdx] is set equal to lMvd[compIdx] for compIdx=0 . . . 1.

Figure 2:
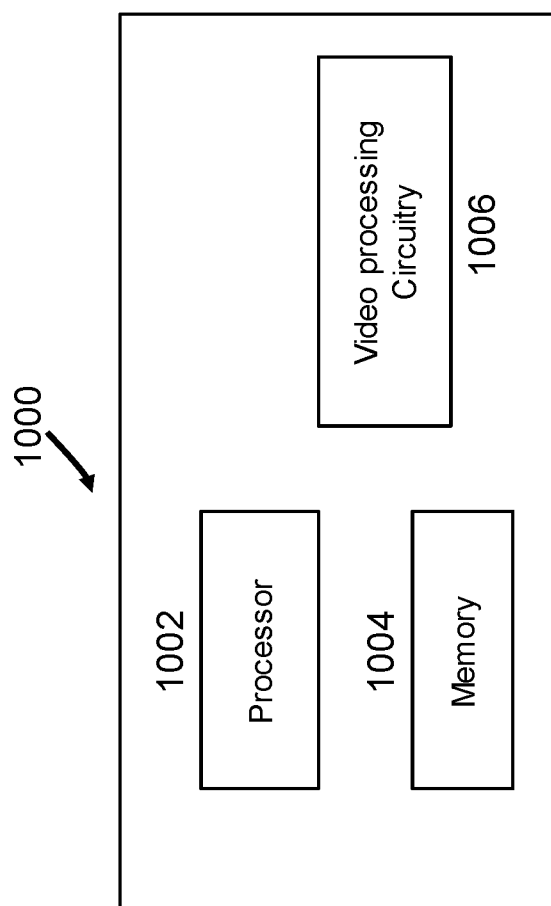
FIG. 2 is a block diagram of an example hardware platform for implementing one or more methods described in the present document.

FIG. 2 is a block diagram of a video processing apparatus 1000. The apparatus 1000 may be used to implement one or more of the methods described herein. The apparatus 1000 may be embodied in a smartphone, tablet, computer, Internet of Things (IoT) receiver, and so on. The apparatus 1000 may include one or more processors 1002, one or more memories 1004 and video processing hardware 1006. The processor(s) 1002 may be configured to implement one or more methods described in the present document. The memory (memories) 1004 may be used for storing data and code used for implementing the methods and techniques described herein. The video processing hardware 1006 may be used to implement, in hardware circuitry, some techniques described in the present document.

Figure 3:
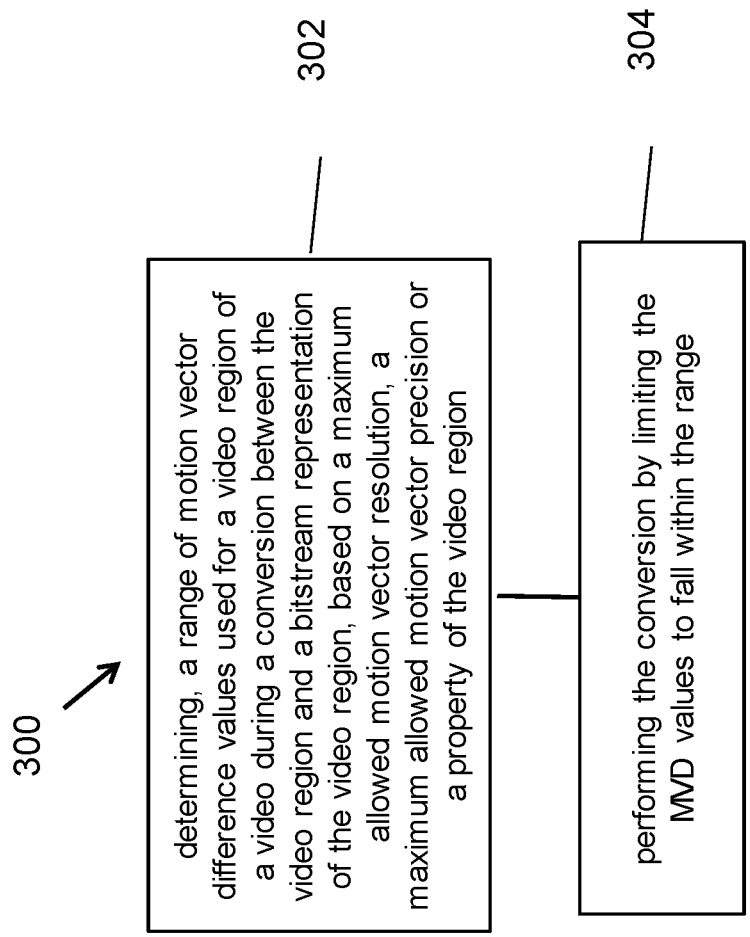
FIG. 3 is a flowchart for an example method of video processing.

FIG. 3 is a flowchart for an example method 300 of video processing. The method 300 includes determining (302), a range of motion vector difference (MVD) values used for a video region of a video during a conversion between the video region and a bitstream representation of the video region, based on a maximum allowed motion vector resolution, a maximum allowed motion vector precision or a property of the video region. The method 300 includes performing (304) the conversion by limiting the MVD values to fall within the range.

The following listing of solutions provide embodiments that can addressed the technical problems described in the present document, among other problems.

1. A video processing method, comprising: determining, a range of motion vector difference (MVD) values used for a video region of a video during a conversion between the video region and a bitstream representation of the video region, based on a maximum allowed motion vector resolution, a maximum allowed motion vector precision or a property of the video region; and performing the conversion by limiting the MVD values to fall within the range.

2. The method of solution 1, wherein the range is applied during the conversion all video regions of the video.

3. The method of any of solutions 1-2, wherein the range is equal to a range of motion vectors for the video region.

4. The method of any of solutions 1-3, wherein the limiting includes: scaling MVD components to a precision; and clipping an out of the scaling to the range.

5. The method of any of solutions 1-4, wherein the property of the video region includes coded information of the video region.

6. The method of any of solutions 1 to 5, wherein the range is selected from a set of multiple possible ranges for the video.

7. The method of any of solutions 1 to 4, wherein the property of the video region includes a precision of a motion vector predictor used for the video region.

8. The method of any of solutions 1 to 4, wherein the property of the video region corresponds to value of MVShift, where MVShift is a variable associated with the video region, and wherein MVShift depends on an affine_inter_flag, or an amvr_flag or an amvr_precision_flag associated with the video region.

9. The method of solution 1, wherein the property of the video region corresponds to a coding mode used for the conversion.

10. The method of solution 9, wherein the coding mode is an intra block copy mode, and wherein the range corresponds to $[-2^{K+1}, 2^{K+L}-1]$, where K and L are integers representing a range of integer part of a motion vector (MV), and a range of a fractional part of a MV respectively.

11. The method of solution 10, wherein K=13 and L=0.

12. The method of solution 1, wherein the property of the video region corresponds to a motion model used for the conversion.

13. The method of solution 1, wherein the property of the video region is that motion of the video region is modeled using a translational model, and, as a result, the range is determined to be $[-2^{K+1}, 2^{K+L}-1]$, where K and L are integers representing a range of integer part of a motion vector (MV), and a range of a fractional part of a MV respectively.

14. The method of solution 13, wherein K=13, L=2.

15. The method of solution 1, wherein the property of the video region is that motion of the video region is modeled using a non-translational model, and, as a result, the range is determined to be $[-2^{K+1}, 2^{K+L}-1]$, where K and L are integers representing a range of integer part of a motion vector (MV), and a range of a fractional part of a MV respectively.

16. The method of solution 15, wherein K=13, L=4.

17. The method of solution 1, wherein the limiting includes limiting a rounded value of the MVD to the range.

18. A video processing method, comprising: determining, a range of motion vector difference (MVD) values used for a video region of a video during a conversion between the video region and a bitstream representation of the video region; and performing, during a semantic interpretation performed in the conversion, a clipping operation on MVD values to fall within the range.

19. The method of any of solutions 1 to 18, wherein the video region corresponds to a video block.

20. The method of any of solutions 1 to 19, wherein the conversion includes generating pixel values of the video region from the bitstream representation.

21. The method of any of solutions 1 to 20, wherein the conversion includes generating the bitstream representation from pixel values of the video region.

22. A video processing apparatus comprising a processor configured to implement one or more of examples 1 to 21.

23. A computer-readable medium having code stored thereon, the code, when executed by a processor, causing the processor to implement a method recited in any one or more of examples 1 to 21.

Items listed in Section 4 provide further variations of the solutions listed above.

Figure 4:
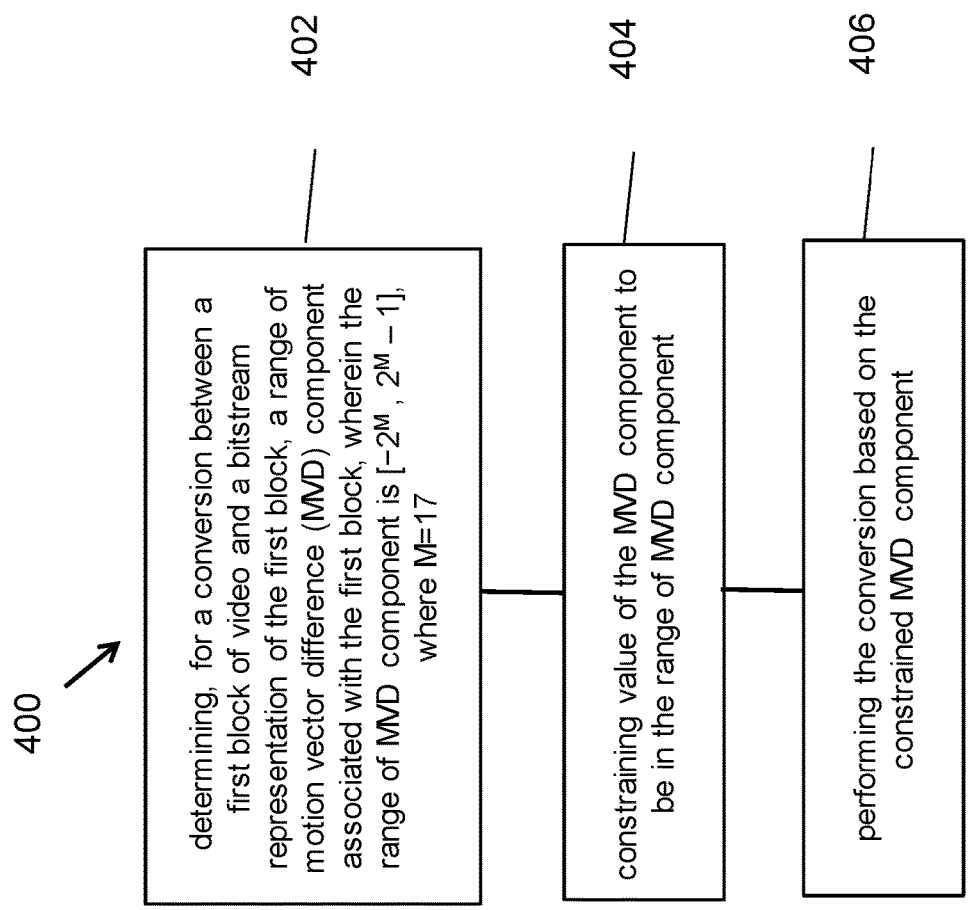
FIG. 4 is a flowchart for an example method of video processing.

FIG. 4 is a flowchart for an example method 400 of video processing. The method 400 includes determining (402), for a conversion between a first block of video and a bitstream representation of the first block, a range of motion vector difference (MVD) component associated with the first block, wherein the range of MVD component is $[-2^M, 2^M-1]$, where M=17; constraining (404) value of the MVD component to be in the range of MVD component; and performing (406) the conversion based on constrained range of MVD component.

In some examples, the range is adapted to an allowable MVD precision and/or allowable motion vector (MV) precision of a codec.

In some examples, the allowable MVD precision and/or allowable motion vector (MV) precision is 1/16-luma-sample precision.

In some examples, when there are multiple allowable MVD precisions and/or MV precisions in the codec, the range of MVD component is adapted to a finest precision of the multiple allowable MVD precisions and/or MV precisions.

In some examples, when the multiple allowable MVD precisions and/or MV precisions include 1/16-luma-sample, 1/4-luma-sample, 1-luma-sample, and 4-luma-sample, the range of MVD component is adapted to the 1/16-luma-sample precision.

In some examples, the range of MVD component is determined to be $[-2^M, 2^M-1]$, where M=K+L, in which K denotes the number of bits used to represent an integer part of the MVD component, and L denotes the number of bits used to represent a fractional part of the MVD component, wherein the MVD component is represented in $1/2^L$-luma-sample precision, and/or a range of MV component associated with the first block is determined to be $[-2^M, 2^M-1]$, where M=K+L, in which K denotes the number of bits used to represent an integer part of the MV component, and L denotes the number of bits used to represent a fractional part of the MV component, wherein the MV component is represented in $1/2^L$-luma-sample precision, M, K and L are positive integers.

In some examples, K=13, L=4 and M=17.

In some examples, the MVD component is a decoded/signaled MVD component coded in a bitstream, or a converted MVD component associated with to a certain precision through an internal shifting operation in decoding process.

In some examples, the MVD component includes a horizontal MVD component and a vertical MVD component, and the horizontal MVD component and the vertical MVD component have the same range.

In some examples, the MVD component is represented by integral bits, fractional bits, and a sign bit.

In some examples, the range of an MV associated with the first block is same as the range of MVD component.

Figure 5:
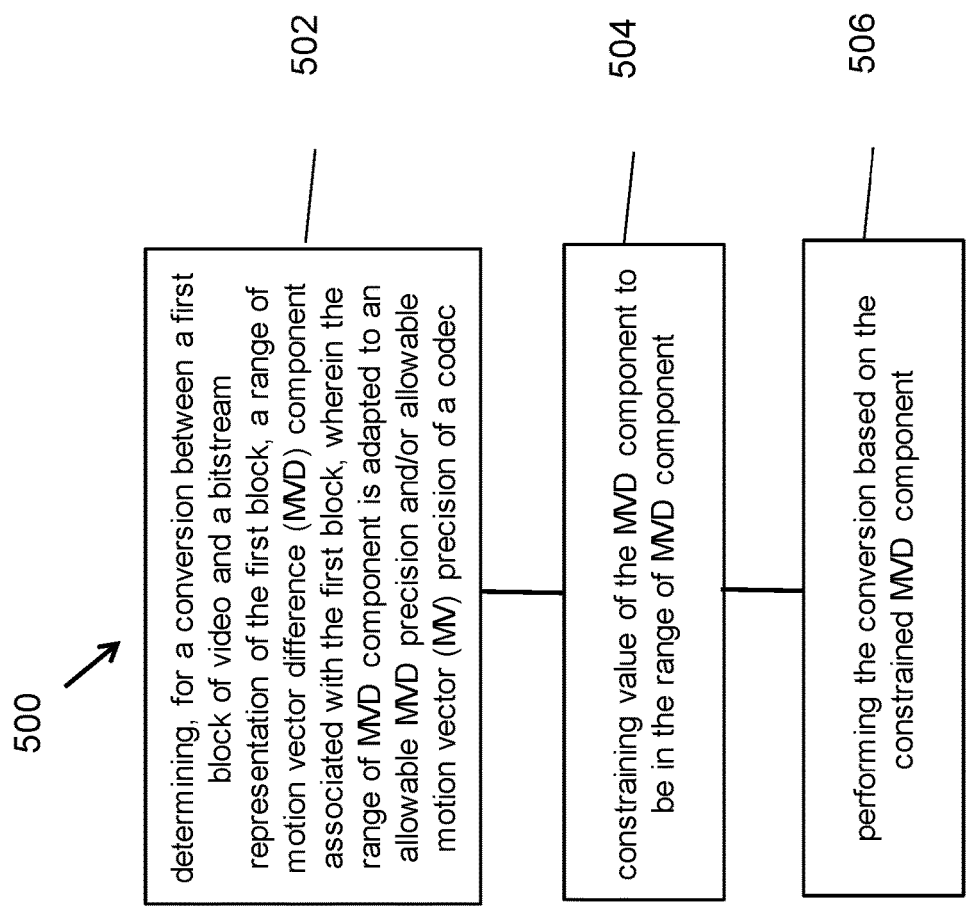
FIG. 5 is a flowchart for an example method of video processing.

FIG. 5 is a flowchart for an example method 500 of video processing. The method 500 includes determining (502), determining, for a conversion between a first block of video and a bitstream representation of the first block, a range of motion vector difference (MVD) component associated with the first block, wherein the range of MVD component is adapted to an allowable MVD precision and/or allowable motion vector (MV) precision of a codec; constraining (504) value of the MVD component to be in the range of MVD component; and performing (506) the conversion based on constrained range of MVD component.

In some examples, the MVD component is a decoded/signaled MVD component coded in a bitstream, or a converted MVD component associated with to a certain precision through an internal shifting operation in decoding process.

In some examples, the decoded/signaled MVD component is required to be in a range of $[-2^M, 2^M-1]$, where M=17.

In some examples, the MVD component is represented by integral bits, fractional bits, and a sign bit.

In some examples, the range of MVD component is determined to be $[-2^M, 2^M-1]$, where M=K+L, in which K denotes the number of bits used to represent an integer part of the MVD component, and L denotes the number of bits used to represent a fractional part of the MVD component, wherein the MVD component is represented in $\frac{1}{2^L}$-luma-sample precision, and/or a range of MV component associated with the first block is determined to be $[-2^M, 2^M-1]$, where M=K+L, in which K denotes the number of bits used to represent an integer part of the MV component, and L denotes the number of bits used to represent a fractional part of the MV component, wherein the MV component is represented in $\frac{1}{2^L}$-luma-sample precision, M, K and L are positive integers.

In some examples, the values of all decoded MVD components are first scaled to the $\frac{1}{2^L}$-luma-sample precision, and then clipped to the range of MVD component $[-2^M, 2^M-1]$.

In some examples, when there are multiple allowable MVD precisions and/or MV precisions in the codec, the range of MVD component is adapted to a finest precision of the multiple allowable MVD precisions and/or MV precisions.

In some examples, when the multiple allowable MVD precisions and/or MV precisions include ¹⁄₁₆-luma-sample precision, ¼-luma-sample precision, 1-luma-sample precision, and 4-luma-sample precision, the range of MVD component is adapted to ¹⁄₁₆-luma-sample precision, and the value of MVD component is constrained and/or clipped to be in the range.

In some examples, K=13, L=4 and M=17.

In some examples, the MVD component includes a horizontal MVD component and a vertical MVD component, and the horizontal MVD component and the vertical MVD component have the same range.

In some examples, the range of the MV is same as the range of MVD component.

Figure 6:
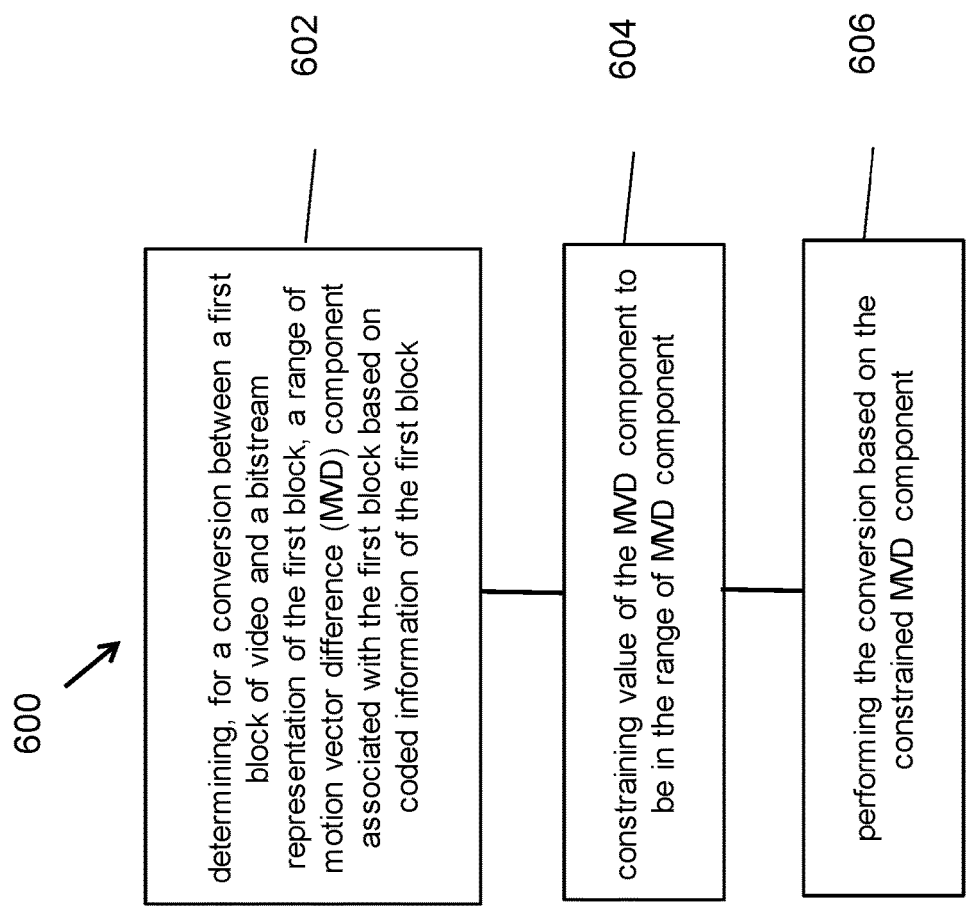
FIG. 6 is a flowchart for an example method of video processing.

FIG. 6 is a flowchart for an example method 600 of video processing. The method 600 includes determining (602), for a conversion between a first block of video and a bitstream representation of the first block, a range of motion vector difference (MVD) component associated with the first block based on coded information of the first block; constraining (604) value of the MVD component to be in the range of MVD component; and performing (606) the conversion based on the constrained MVD component.

In some examples, the range of MVD component includes multiple sets of ranges of MVD components.

In some examples, the coded information includes at least one of motion vector (MV) predictor precision, MVD component precision and MV precision.

In some examples, when the MVD precision of the MVD component is ½-luma-sample, the range of MVD component is determined to be a range of $[-2^{K+1}, 2^{K+L}-1]$, and the value of MVP component is constrained and/or clipped to be in the range, in which K denotes the number of bits used to represent an integer part of the MVD component, and L denotes the number of bits used to represent a fractional part of the MVD component, K and L are positive integers.

In some examples, K is 13, and L is one of 4, 3, 2, 1, 0, −1, −2, −3 and −4.

In some examples, the coded information includes a variable MvShift associated with MVD, where the derivation of the variable MvShift is dependent on whether AFFINE is used or not, and/or whether adaptive motion vector resolution (AMVR) is used or not, and/or AMVR accuracy, and/or precision of MVD, and/or merge mode with motion vector difference (MMVD) information, and/or prediction mode of the first block.

In some examples, the variable MvShift is derived from one or more of syntax elements including inter_affine_flag, amvr_flag, and amvr_precision_idx in the coded information.

In some examples, the variable MvShift is derived from one or more of syntax elements including inter_affine_flag, amvr_flag, amvr_precision_idx, sps_fpel_mmvd_enabled_flag, ph_fpel_mmvd_enabled_flag, mmvd_distance_idx, and CuPredMode in the coded information.

In some examples, the coded information includes one or more variables and/or syntax elements indicating coding mode, motion mode and prediction mode of the first block, and whether AFFINE/AMVR is used or not in the coded information.

In some examples, when the prediction mode of the first block is MODE_IBC indicating the first block is coded in IBC mode, the range of MVD component is determined to be a range of $[-2^{K+1}, 2^{K+L}-1]$, and the value of MVP component is constrained and/or clipped to be in the range, in which K denotes the number of bits used to represent an integer part of the MVD component, and L denotes the number of bits used to represent a fractional part of the MVD component, K and L are positive integers.

In some examples, K=13, and L=0.

In some examples, when index of the motion model of the first block is equal to 0, the range of MVD component is determined to be a range of $[-2^{K+1}, 2^{K+L}-1]$, and the value of MVP component is constrained and/or clipped to be in the range, in which K denotes the number of bits used to represent an integer part of the MVD component, and L denotes the number of bits used to represent a fractional part of the MVD component, K and L are positive integers.

In some examples, K=13, and L=2.

In some examples, when the prediction mode of the first block is MODE_INTER and the variable of affine_inter_flag is false, the range of MVD component is determined to be a range of $[-2^{K+1}, 2^{K+L}-1]$, and the value of MVP component is constrained and/or clipped to be in the range, in which K denotes the number of bits used to represent an integer part of the MVD component, and L denotes the number of bits used to represent a fractional part of the MVD component, K and L are positive integers.

In some examples, K=13, and L=2.

In some examples, when index of the motion model of the first block is not equal to 0, the range of MVD component is determined to be a range of $[-2^{K+1}, 2^{K+L}-1]$, and the value of MVP component is constrained and/or clipped to be in the range, in which K denotes the number of bits used to represent an integer part of the MVD component, and L denotes the number of bits used to represent a fractional part of the MVD component, K and L are positive integers.

In some examples, K=13, and L=4.

In some examples, when the prediction mode of the first block is MODE_INTER and the variable of affine_inter_flag is true, the range of MVD component is determined to be a range of $[-2^{K+1}, 2^{K+L}-1]$, and the value of MVP component is constrained and/or clipped to be in the range, in which K denotes the number of bits used to represent an integer part of the MVD component, and L denotes the number of bits used to represent a fractional part of the MVD component, K and L are positive integers.

In some examples, K=13, and L=4.

In some examples, if a decoded MVD component is in fractional precision, the decoded MVD component is rounded to integer MVD component.

In some examples, the rounded integer MVD component is in a range of $[-2^K, 2^K-1]$, where K=13.

In some examples, the value of all decoded MVD component is explicitly clipped to the range of MVD component during the semantic interpretation other than using a bitstream constraint.

Figure 7:
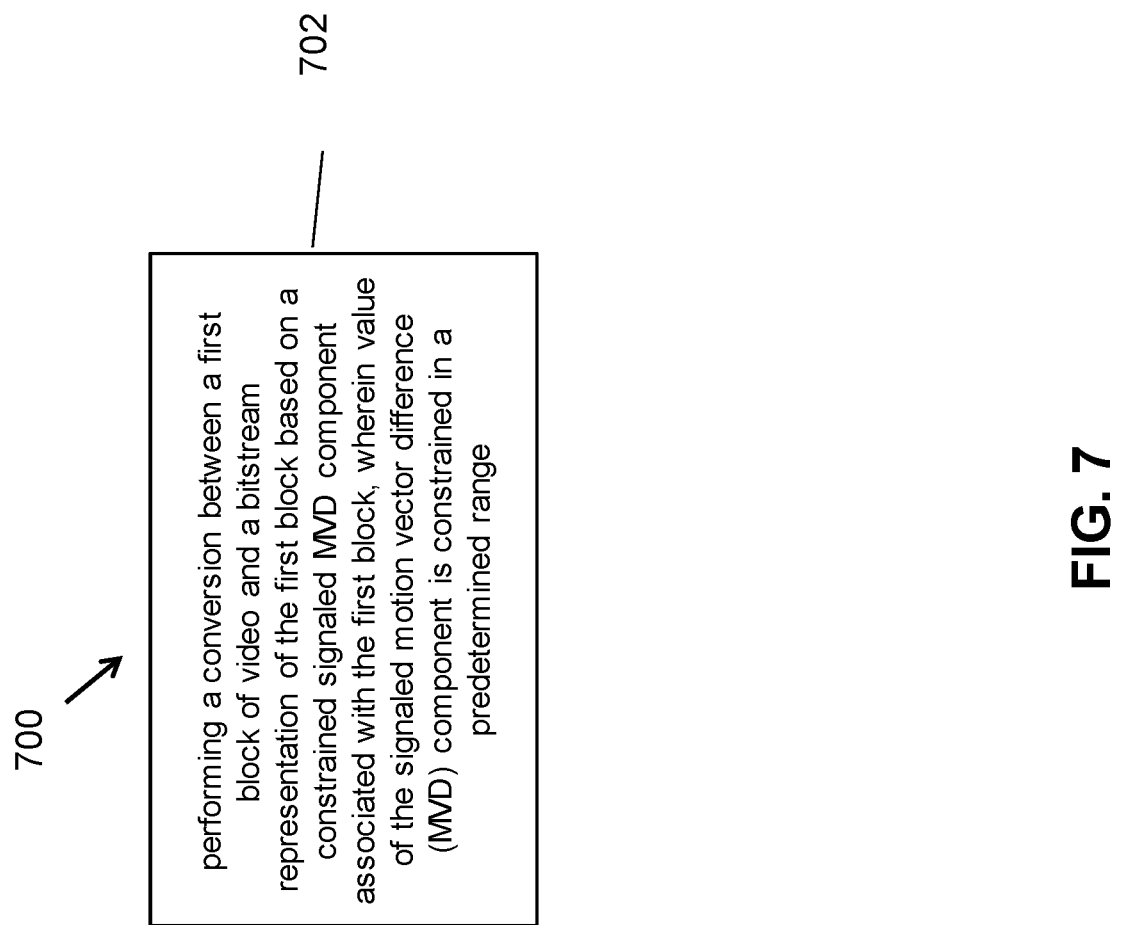
FIG. 7 is a flowchart for an example method of video processing.

FIG. 7 is a flowchart for an example method 700 of video processing. The method 700 includes performing (702) a conversion between a first block of video and a bitstream representation of the first block based on a constrained signaled MVD component associated with the first block, wherein value of the signaled motion vector difference (MVD) component is constrained in a predetermined range.

In some examples, the predetermined range is associated with precision of MVD component associated with the first block.

In some examples, precision of MVD component associated with the first block is 1/16-pel and the predetermined range is $[-2^{17}, 2^{17}-1]$.

In some examples, when the precision of MVD component is 1/16-pel, the value of the signaled MVD components is constrained in the predetermined range of $[-2^{K+1}, 2^{K+L}-1]$, in which K denotes the number of bits used to represent an integer part of the MVD component, and L denotes the number of bits used to represent a fractional part of the MVD component, where K and L are integers.

In some examples, K=13, L=4.

In some examples, when the precision of MVD component is 1/4-pel, the value of the signaled MVD components is constrained in the predetermined range of $[-2^{K+1}, 2^{K+L}-1]$, in which K denotes the number of bits used to represent an integer part of the MVD component, and L denotes the number of bits used to represent a fractional part of the MVD component, where K and L are integers.

In some examples, K=13, L=2.

In some examples, when the precision of MVD component is 1-pel, the value of the signaled MVD components is constrained in the predetermined range of $[-2^{K+1}, 2^{K+L}-1]$, in which K denotes the number of bits used to represent an integer part of the MVD component, and L denotes the number of bits used to represent a fractional part of the MVD component, where K and L are integers.

In some examples, K=13, L=0.

In some examples, when the precision of MVD component is 4-pel, the value of the signaled MVD components is constrained in the predetermined range of $[-2^{K+1}, 2^{K+L}-1]$, in which K denotes the number of bits used to represent an integer part of the signaled MVD component, and L denotes the number of bits used to represent a fractional part of the signaled MVD component, where K and L are integers.

In some examples, K=13, L=-2.

In some examples, the value of the signaled MVD components is constrained in the predetermined range of $[-2^{K+1}, 2^{K+L}-1]$, in which K denotes the number of bits used to represent an integer part of the MVD component, and L denotes the number of bits used to represent a fractional part of the MVD component, where K=13, L=4.

Figure 8:
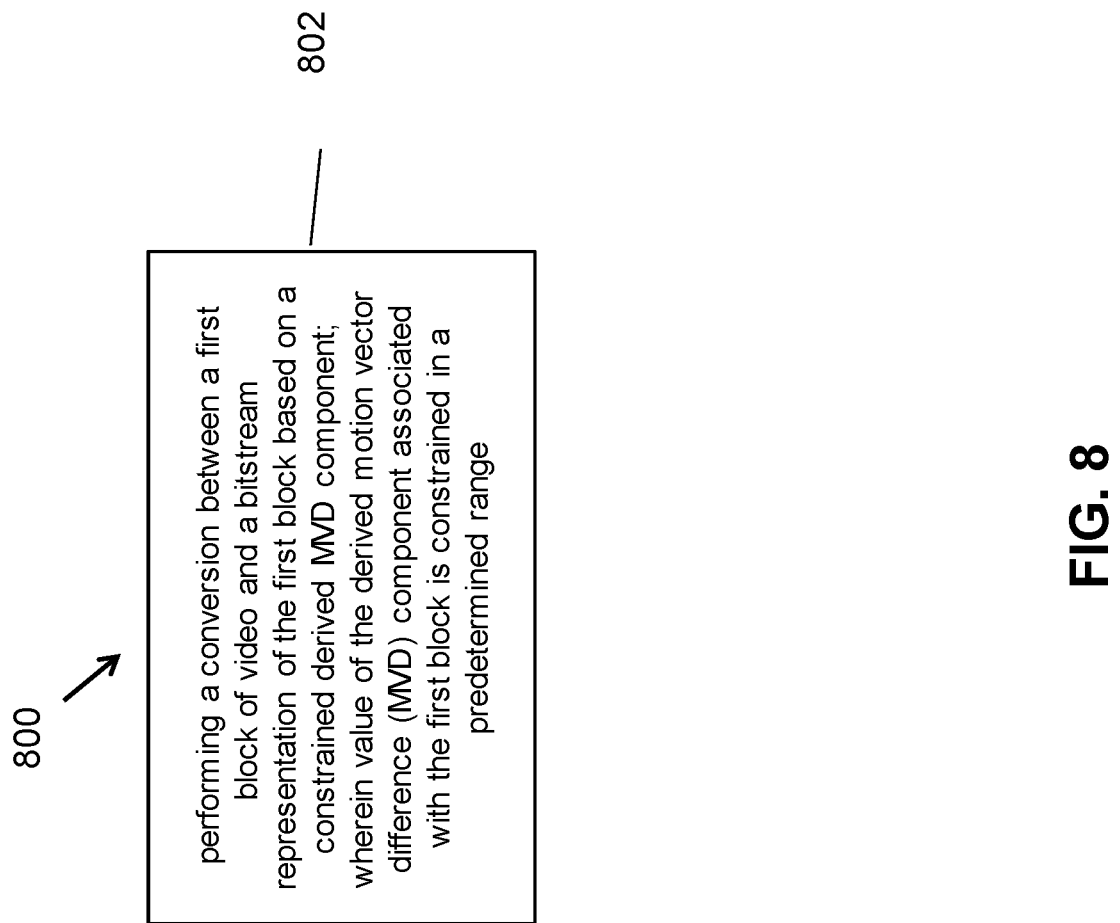
FIG. 8 is a flowchart for an example method of video processing.

FIG. 8 is a flowchart for an example method 800 of video processing. The method 800 includes performing (802) a conversion between a first block of video and a bitstream representation of the first block based on a constrained derived MVD component; wherein value of the derived motion vector difference (MVD) component associated with the first block is constrained in a predetermined range.

In some examples, the derived MVD component is the list-X MVD components that derived from the corresponding list-Y MVD components, where X=0 or 1, and Y=1 or 0.

In some examples, the list-X MVD components are derived by the signaled list-Y MVD components according to a Symmetric Motion Vector Difference Mode.

In some examples, the predetermined range is associated with precision of MVD component associated with the first block.

In some examples, precision of MVD component associated with the first block is 1/16-pel and the predetermined range is $[-2^{17}, 2^{17}-1]$.

In some examples, the value of the derived MVD components is constrained in the predetermined range of $[-2^{K+1}, 2^{K+L}-1]$, in which K denotes the number of bits used to represent an integer part of the MVD component, and L denotes the number of bits used to represent a fractional part of the derived MVD component, where K and L are integers.

In some examples, K=13, and L=4.

In some examples, the derived MVD component is the internal MVD values that all MVD components in a codec are converted into a same precision.

In some examples, the signaled MVD values are shifted to internal 18-bit MVD values according to adaptive motion vector resolution (AMVR) flags to obtain the derived MVD component.

In some examples, the conversion generates the first block of video from the bitstream representation.

In some examples, the conversion generates the bitstream representation from the first block of video.

In the listing of examples in this present document, the term conversion may refer to the generation of the bitstream representation for the current video block or generating the current video block from the bitstream representation. The bitstream representation need not represent a contiguous group of bits and may be divided into bits that are included in header fields or in codewords representing coded pixel value information.

In the examples above, the applicability rule may be pre-defined and known to encoders and decoders.

It will be appreciated that the disclosed techniques may be embodied in video encoders or decoders to improve compression efficiency using techniques that include the use of various implementation rules of considerations regarding the use of a differential coding mode in intra coding, as described in the present document.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
   determining, for a first conversion between a first block of a video and a bitstream of the video, a first motion vector difference (MVD) component associated with the first block and included in the bitstream; and
   performing the first conversion at least based on the first MVD component;
   wherein a value of the first MVD component is constrained in a predetermined range, wherein the predetermined range is $[-2^M, 2^M-1]$, where M=17,
   wherein the method further comprises:
      determining, for a second conversion between a second block of the video and the bitstream, a second MVD component of a first list associated with the second block and included in the bitstream;
      determining, based on the second MVD component, a third MVD component of a second list associated with the second block; and
      performing the second conversion at least based on the second MVD component and third MVD component, and
      wherein the value of the second MVD component is constrained in a predetermined range which has a maximum value $2^M-1$, or the value of the third MVD component is constrained in a predetermined range which has a maximum value $2^M-1$.

2. The method of claim 1, wherein the first list is a list X with X=0, and the second list is a list Y with Y=1 correspondingly.

3. The method of claim 1, wherein the third MVD component is a negative of the second MVD component.

4. The method of claim 1, wherein the predetermined range of the first MVD component is adapted to an allowable MVD precision and/or allowable motion vector precision of a codec.

5. The method of claim 4, wherein the allowable MVD precision and/or allowable motion vector precision is 1/16-luma-sample precision.

6. The method of claim 1, wherein the M=K+L, wherein K=13 and L=4, in which K denotes the number of bits used to represent an integer part of the first MVD component, and L denotes the number of bits used to represent a fractional part of the first MVD component, wherein the first MVD component is represented in 1/2L-luma-sample precision.

7. The method of claim 1, wherein the conversion comprises encoding the first block into the bitstream.

8. The method of claim 1, wherein the conversion comprises decoding the first block from the bitstream.

9. An apparatus for processing video data comprising a processor and a non-transitory memory with instructions thereon, wherein the instructions upon execution by the processor, cause the processor to:
determine, for a first conversion between a first block of a video and a bitstream of the video, a first motion vector difference (MVD) component associated with the first block and included in the bitstream; and
perform the first conversion at least based on the first MVD component;
wherein a value of the first MVD component is constrained in a predetermined range, wherein the predetermined range is $[-2^M, 2^M-1]$, where M=17,
wherein the instructions further cause the processor to:
determine, for a second conversion between a second block of the video and the bitstream, a second MVD component of a first list associated with the second block and included in the bitstream;
determine, based on the second MVD component, a third MVD component of a second list associated with the second block; and
perform the second conversion at least based on the second MVD component and third MVD component, and
wherein the value of the second MVD component is constrained in a predetermined range which has a maximum value $2^M-1$, or the value of the third MVD component is constrained in a predetermined range which has a maximum value $2^M-1$.

10. The apparatus of claim 9, wherein the M=K+L, wherein K=13 and L=4, in which K denotes the number of bits used to represent an integer part of the first MVD component, and L denotes the number of bits used to represent a fractional part of the first MVD component, wherein the first MVD component is represented in 1/2L-luma-sample precision.

11. The apparatus of claim 9, wherein the predetermined range of the first MVD component is adapted to an allowable MVD precision and/or allowable motion vector precision of a codec.

12. The apparatus of claim 11, wherein the allowable MVD precision and/or allowable motion vector precision is 1/16-luma-sample precision.

13. The apparatus of claim 9, wherein the first list is a list X with X=0, and the second list is a list Y with Y=1 correspondingly.

14. The apparatus of claim 9, wherein the third MVD component is a negative of the second MVD component.

15. A non-transitory computer-readable storage medium storing instructions that cause a processor to:
determine, for a first conversion between a first block of a video and a bitstream of the video, a first motion vector difference (MVD) component associated with the first block and included in the bitstream; and
perform the first conversion at least based on the first MVD component;
wherein a value of the first MVD component is constrained in a predetermined range, wherein the predetermined range is $[-2^M, 2^M-1]$, where M=17,
wherein the instructions further cause the processor to:
determine, for a second conversion between a second block of the video and the bitstream, a second MVD component of a first list associated with the second block and included in the bitstream;
determine, based on the second MVD component, a third MVD component of a second list associated with the second block; and
perform the second conversion at least based on the second MVD component and third MVD component, and
wherein the value of the second MVD component is constrained in a predetermined range which has a maximum value $2^M-1$, or the value of the third MVD component is constrained in a predetermined range which has a maximum value $2^M-1$.

16. The non-transitory computer-readable storage medium of claim 15, wherein the M=K+L, wherein K=13 and L=4, in which K denotes the number of bits used to represent an integer part of the first MVD component, and L denotes the number of bits used to represent a fractional part of the first MVD component, wherein the first MVD component is represented in 1/2L-luma-sample precision.

17. The non-transitory computer-readable storage medium of claim 15, wherein the first list is a list X with X=0, and the second list is a list Y with Y=1 correspondingly.

18. The non-transitory computer-readable storage medium of claim 15, wherein the third MVD component is a negative of the second MVD component.

19. The non-transitory computer-readable storage medium of claim 15, wherein the predetermined range of the first MVD component is adapted to an allowable MVD precision and/or allowable motion vector precision of a codec.

20. A non-transitory computer-readable recording medium storing a bitstream which is generated by a method performed by a video processing apparatus, wherein the method comprises:
determining a first motion vector difference (MVD) component associated with a first block of a video; and
generating the bitstream at least based on the first MVD component;
wherein a value of the first MVD component is constrained in a predetermined range, wherein the predetermined range is $[-2^M, 2^M-1]$, where M=17,
wherein the method further comprises:
determining, for a second conversion between a second block of the video and the bitstream, a second MVD component of a first list associated with the second block and included in the bitstream;
determining, based on the second MVD component, a third MVD component of a second list associated with the second block; and
performing the second conversion at least based on the second MVD component and third MVD component, and wherein the value of the second MVD component is constrained in a predetermined range which has a maximum value $2^M-1$, or the value of the third MVD component is constrained in a predetermined range which has a maximum value $2^M-1$.

* * * * *